(12) United States Patent
LeBlanc et al.

(10) Patent No.: US 8,690,436 B2
(45) Date of Patent: Apr. 8, 2014

(54) HUB AND SPINDLE ASSEMBLY (75) Inventors: Jeffry Arnold LeBlanc, Aptos, CA (US); Troy Michael Herndon, San Jose, CA (US); Robert Alan Nottingham, Santa Cruz, CA (US); Alan Lyndon Grantz, Aptos, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/620,080

(22) Filed: Sep. 14, 2012

(65) Prior Publication Data

US 2013/0064484 A1 Mar. 14, 2013

Related U.S. Application Data (63) Continuation of application No. 11/166,823, filed on Jun. 24, 2005, now Pat. No. 8,562,222.

(51) Int. Cl.
*F16C 33/74* (2006.01)
*F16C 32/06* (2006.01)

(52) U.S. Cl.
USPC .............................. 384/130; 384/121; 384/107

(58) Field of Classification Search
USPC .......................... 384/132, 107, 112, 121, 130
See application file for complete search history.

(56) References Cited

U.S. PATENT DOCUMENTS

| | | | | |
|---|---|---|---|---|
| 5,558,445 A | * | 9/1996 | Chen et al. | 384/132 |
| 6,390,681 B1 | * | 5/2002 | Nakazeki et al. | 384/107 |
| 6,404,087 B1 | * | 6/2002 | Ichiyama | 310/90 |
| 6,655,841 B1 | * | 12/2003 | Heine et al. | 384/110 |
| 7,241,050 B2 | * | 7/2007 | Uenosono et al. | 384/107 |
| 2004/0096131 A1 | * | 5/2004 | Aiello et al. | 384/119 |

* cited by examiner

*Primary Examiner* — Justin Krause (57) ABSTRACT

A rotating hub and fixed spindle assembly with first and second fluid dynamic journal bearings and first and second fluid dynamic thrust bearings for a disc drive memory system has a pump seal and a radial ring seal at a first axial terminus for lubricant containment, and a capillary seal and a labyrinth seal at a second axial terminus for lubricant containment and storage. Lubricant fluid pressure differences between first and second seals are minimized through one or more lubricant fluid communicating channels in the hub assembly, in order to minimize lubricant fluid loss through a seal. Lubricant fluid can also be purged of any air bubbles by lubricant fluid circulation through the channel.

17 Claims, 7 Drawing Sheets

Fig. 7

HUB AND SPINDLE ASSEMBLY

CROSS-REFERENCE TO RELATED APPLICATION

This application is a continuation of application Ser. No. 11/166,823, filed Jun. 24, 2005.

TECHNICAL FIELD

The present invention relates to the field of hub and spindle assemblies for disc drive memory systems, and in particular to hub and spindle assemblies having fluid dynamic bearings and associated lubricant seals.

BACKGROUND ART

Disc drive memory systems have been used in computers for many years for storage of digital information. Information is recorded on concentric memory tracks of a magnetic disc medium, the actual information being stored in the form of magnetic transitions within the medium. The discs themselves are mounted on a hub that is rotatably mounted on a fixed spindle. The information is accessed by means of read/write heads generally located on a pivoting arm that moves radially over the surface of the disc. The read/write heads or transducers must be accurately aligned with the storage tracks on the disc to ensure proper reading and writing of information.

During operation, the discs are rotated at very high speeds within an enclosed housing by means of an electric motor generally located inside the hub that supports the discs. One type of motor in common use is known as an in-hub or in-spindle motor. Such in-spindle motors typically have a spindle mounted by means of two ball or fluid dynamic bearing systems to a motor shaft disposed in the center of the hub. Generally, such motors include a stator comprising a plurality of teeth arranged in a circle. Each of the teeth support a plurality of coils or windings that may be sequentially energized to polarize the stator. A plurality of permanent magnets are disposed in alternating polarity adjacent the stators. As the coils disposed on the stators are sequentially energized in alternating polarity, the magnetic attraction and repulsion of each stator to the adjacent magnets cause the spindle to rotate, thereby rotating the disc and passing the information storage tracks beneath the head.

The use of fluid dynamic bearing assemblies in such drive systems has become preferred due to desirable reductions in drive size and noise generation as compared to conventional ball bearing drive systems. In fluid dynamic bearings, a lubricating fluid functions as the bearing surface between a spindle and a hub. Such bearings are of the journal and thrust types. Journal bearings fix the radial position of a hub as it rotates around a spindle. Thrust bearings constrain the axial position of the hub as it rotates.

One, or the other, or both mating hub and spindle surfaces can be patterned with grooves and lands in various patterns to make lubricant fluid pumps that are actuated by the rotation of the hub relative to the spindle. Such pumps can maintain lubricant fluid pressure gradients while the hub is rotating, providing thrust and journal bearing functions. When the hub is not rotating, lubricant fluids are maintained in place in the hub to spindle gap by capillary forces.

For disc drives having first and second covers mounted to the spindle for improved mechanical stability, lubricant fluid loss is inevitable at both termini of the spindle, and is an operational lifetime limiting factor for such disc drives. Sealing techniques include capillary seals and labyrinth seals. Capillary seals are flared channels that rely on the surface tension of the lubricant fluid to form a meniscus as the walls of a channel flare apart. Capillary seals can also serve as reservoirs for lubricant fluid, but they are prone to lubricant loss through evaporation at the surface of the meniscus. Labyrinth seals can be used with capillary seals to further reduce lubricant evaporation by providing an elongate pathway for lubricant vapor to escape. Unfortunately, effective labyrinth seals tend to consume a fair amount of space, and are therefore difficult to use at both ends of a spindle. Different seal designs can be used at each end of a spindle, but is important for the lubricant fluid pressures at the first and second seals to be at nearly the same pressure to reduce the loss of lubricant fluid from the seal with the lower pressure.

SUMMARY OF THE INVENTION

An embodiment of the present invention provides a hub and spindle assembly for a disc drive having at least one journal bearing, first and second thrust bearings, first and second fluid seals adjacent to the first and second thrust bearings, and a channel for a lubricant fluid that connects the first and second fluid seals. Additionally, lubricant fluid circulation through the channel tends to purge any air bubbles from the lubricant fluid.

DETAILED DESCRIPTION OF THE EMBODIMENTS OF THE INVENTION

Figure 1:
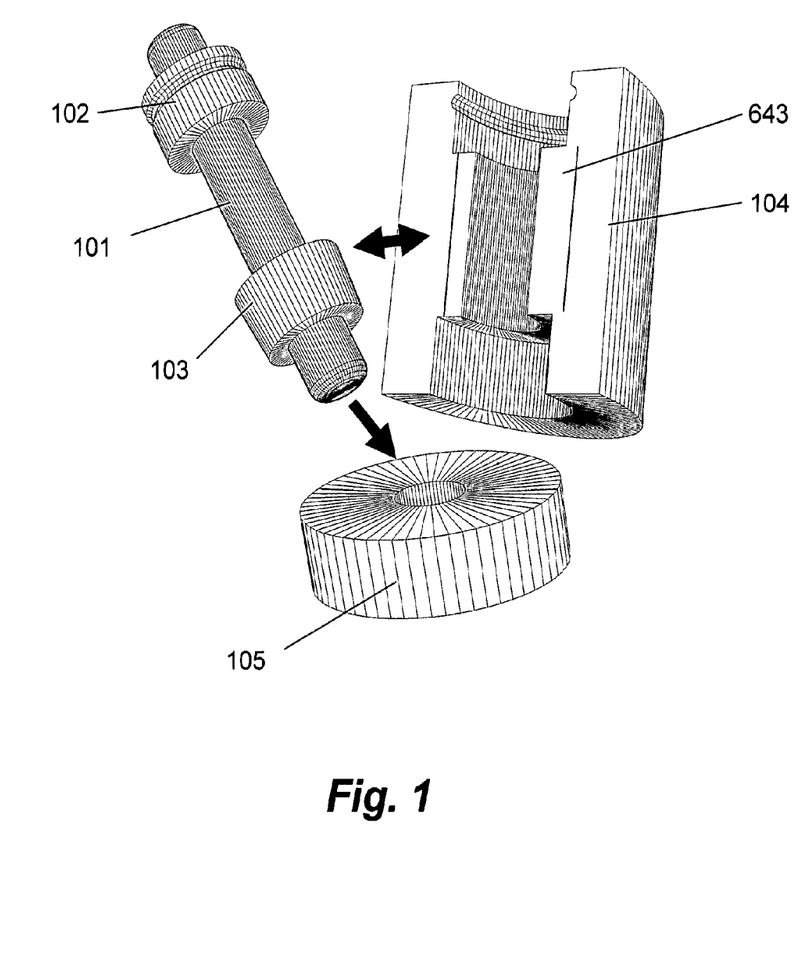
FIG. 1 presents an exploded view of a hub and spindle assembly according to an embodiment of the invention.

FIG. 1 shows an exploded, cut-away view of a hub and spindle assembly according to an embodiment of the invention. Spindle 101 is affixed to base plate 105 according to any one of a variety of techniques well known to one of ordinary skill in the art, such as screwing, bolting, press fitting, welding, etc. First thrust washer 102 and second thrust washer 103 are affixed to spindle 103, along the axis as indicated, likewise according to any one of a variety of techniques well known to one of ordinary skill in the art, such as press fitting. Items 643 and 104 are cut-away sections (for purposes of illustration) of the journal bearing and hub assembly that rotates about spindle 101 when assembled. In some embodiments of the invention, journal bearing sleeve 143 and hub 104 are separate pieces that are coupled together using any of a number of techniques widely known by one of ordinary skill in the art (e.g., press fit). In other embodiments of the invention, the journal bearing sleeve is an integral part of hub 104.

Figure 2A:
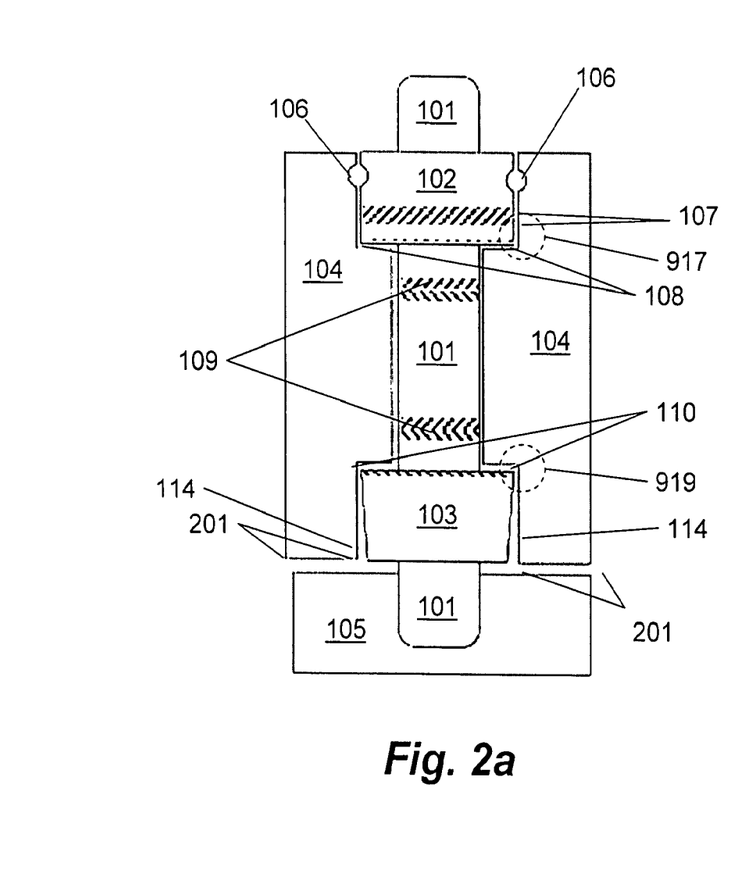
FIG. 2*a* illustrates a cross-sectional view of a hub and spindle assembly according to an embodiment of the invention.

FIG. 2a illustrates a cross-section of an assembled hub and spindle assembly according to an embodiment of the invention in which the bearing sleeve is an integral part of hub 104. Like numerical references refer to like drawing elements in all of the drawings. Spindle 101, first thrust washer 102, second thrust washer 103 and base plate 105 are all fixed together and stationary with respect to each other. As used herein, a washer means a cylindrical or truncated conical piece defining a coaxial cylindrical cutout or truncated conical cutout. First thrust washer 102 and second thrust washer 103 are washers disposed adjacent to the first and second ends, respectively, of spindle 101. The thrust washers may be separately fabricated pieces that are assembled with spindle 101, or in other embodiments one of the thrust washers may be formed as a protruding annular ring that is integral to spindle 101.

Hub 104 rotates relative to the spindle 101. Spindle 101 is patterned with fluid dynamic pump patterns 109 to create a pair of journal bearings, regions in which the lubricant fluid pressure is elevated. The patterns comprise lands and grooves that compress the lubricant fluid to the center of each band pattern 109. Although chevron patterns 109 are illustrated in FIG. 2, other pattern options are well know in the art of fluid dynamic bearings.

The surface 108 of first thrust washer 102, that faces the second thrust washer 103, is also patterned as a fluid dynamic pump to create an annular area of increased lubricant fluid pressure to form a first thrust bearing. Likewise, the surface 110 of lower thrust washer 103, that faces the first thrust washer 102, is patterned as a fluid dynamic pump to create an annular area of increased lubricant fluid pressure to form a lower thrust bearing. An example of fluid pump pattern for a thrust bearing is a sequence of chevrons wrapped in an annular pattern around the annular surface of the thrust washer.

Figure 2B:
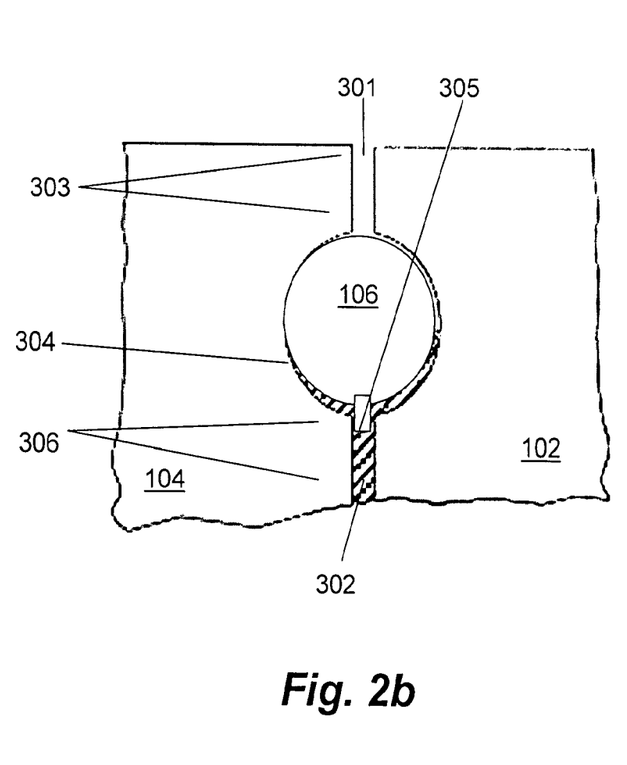
FIG. 2*b* illustrates details of a radial ring seal according to a further embodiment of the invention.

Referring again to FIG. 2a, lower thrust washer 103 conically tapers toward spindle 101 proximate to base 105 to create a flared annular gap 114 forming a capillary seal for the lubricant fluid (not shown). First thrust washer 102 is circumferentially patterned with pumping seal 107. Pumping seal 107 is a fluid dynamic pump that directs lubricant fluid toward thrust bearing 108 when the hub is rotating. Radial ring seal 106 is shown in cross-section. Referring now to FIG. 2b, the radial ring seal provides a capillary barrier 305 to lubricant fluid 307 through its flaring channel width 305, followed by a constricting channel width 304 connecting with labyrinth seal 303. Whereas fluid dynamic seal pump 102 serves principally to contain the lubricant fluid while the hub 104 is in rotation, ring seal 106 serves to contain the lubricant fluid through capillary action, and limit the escape of lubricant fluid vapor when hub 104 is not rotating. In some embodiments, the interior of cavity 106 is coated with a barrier film coating ("BFC") to provide a high energy surface that can repel lubricant fluid, as an additional lubricant containment measure.

Figure 3:
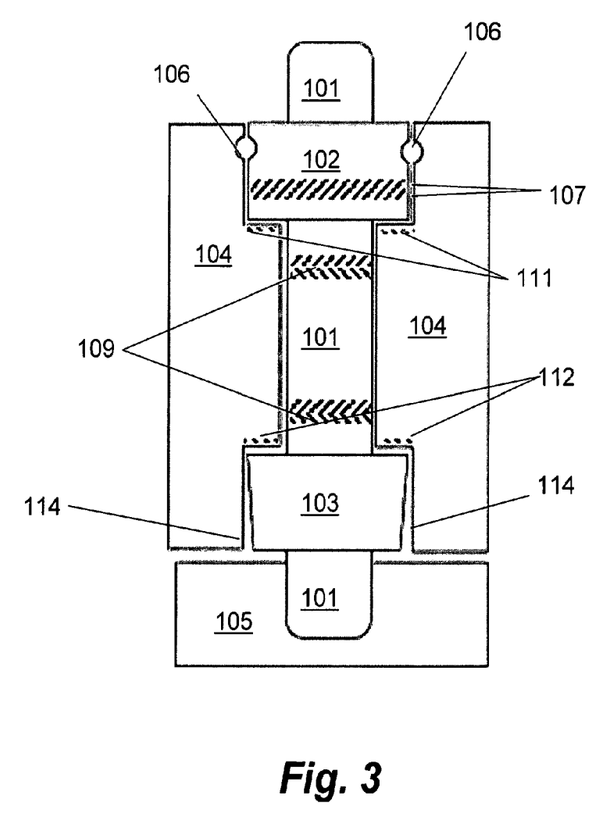
FIG. 3 illustrates a cross-sectional view of a hub and spindle assembly according to another embodiment of the invention.

FIG. 3 illustrates an alternate embodiment of the invention. In this case, the fluid dynamic pumps for the thrust bearings are patterned on the matching surfaces of the hub, 111 and 112. In general the fluid dynamic pumps may be patterned on either one, or both mating surfaces of a fluid dynamic bearing. The choice of which surface is usually dictated by cost and convenience of fabrication. Likewise (although not illustrated), the fluid dynamic pumps for the journal bearings can be patterned on the inside of journal bearing sleeve.

Figure 4:
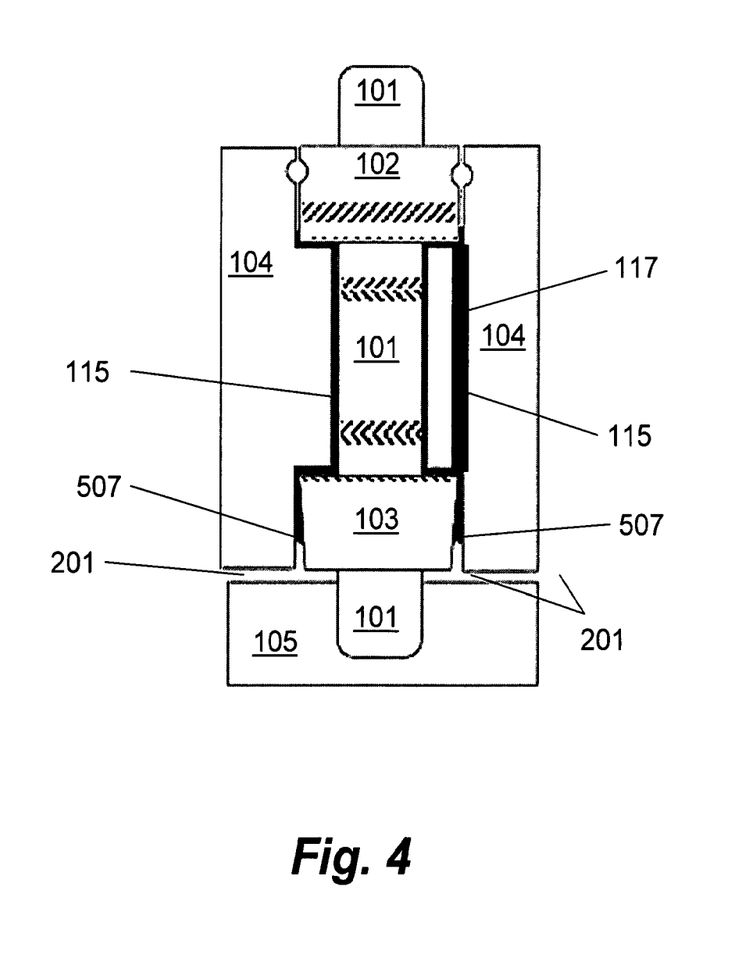
FIG. 4 illustrates a cross-sectional view of a hub and spindle assembly showing lubricant fluid and a fluid communication channel according to an embodiment of the invention.

FIG. 4 is a cross-sectional view of a hub and spindle assembly according to an embodiment of the invention showing lubricant fluid 115 in place. Note that the capillary seal surrounding second thrust washer 103 can serve as a reservoir for lubricating fluid. Evaporation of lubricant fluid from the meniscus 507 can be minimized because the bottom of hub 104, and the adjacent surface of base plate 105 form a labyrinth seal 201. In the illustrated embodiment, the journal bearing sleeve is an integral part of hub 104.

This asymmetrical seal design provides for a capillary seal, that can also serve as a lubricant fluid reservoir, at the second end of the spindle where a labyrinth seal is also conveniently formed to suppress lubricant fluid evaporation. The first seal is a fluid dynamic pump seal, backed up by a radial ring seal for physically compact lubricant fluid containment. However, as discussed above, it is important that the first and the second fluid seals operate at nearly the same lubricant fluid pressures, in order to avoid a lubricant pressure level difference that can lead to lubricant loss through at least one of the seals. Lubricant fluid communication channel 117 is provided to equalize lubricant pressures at both seals. Without such pressure equalization, generally the lubricant fluid pressure in the vicinity of the pump seal of the first thrust washer 102 is greater than the lubricant fluid pressure in the vicinity of the capillary, second seal (about one atmosphere for the second seal) formed by the second thrust washer and a facing portion of hub 104. This can result in lubricant fluid being pumped out of the second seal when the hub 104 is rotating. Lubricant fluid communication channel 115 allows for lubricant fluid flow from the first seal area to the second seal area to equalize lubricant fluid pressures. Also, the pump seal of first thrust washer 102 can sometimes inject air bubbles into the lubricant fluid 115. If such bubbles accumulate, they can lead to fluid dynamic bearing failure. The circulation of lubricant 115 from the first seal to the second seal via the journal bearing, and then from the second seal back to the first seal via lubricant fluid communication channel 117 tends to purge such bubbles so that they do not accumulate.

Figure 5:
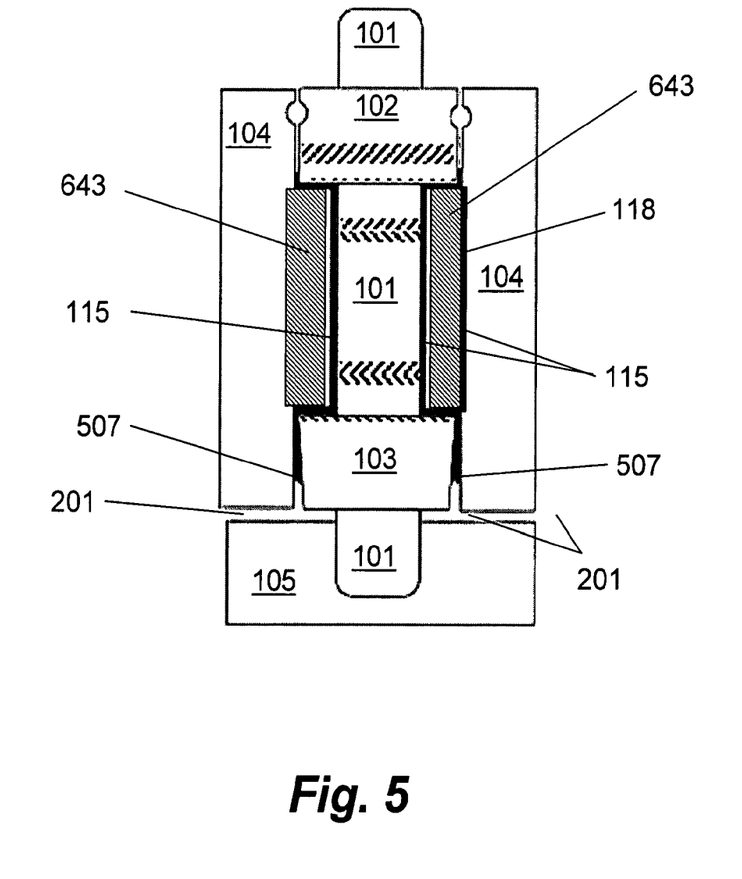
FIG. 5 illustrates a cross-sectional view of a hub and spindle assembly showing lubricant fluid and a fluid communication channel according to another embodiment of the invention.

FIG. 5 illustrates a cross-section of an alternate embodiment of a hub and spindle assembly with a lubricant fluid communication channel, in which the hub 104 and the journal bearing sleeve 643 are separate parts that have been assembled together, as described above. The other features, and the operation of this embodiment are the same as described above in connection with FIG. 4.

Figure 6A:
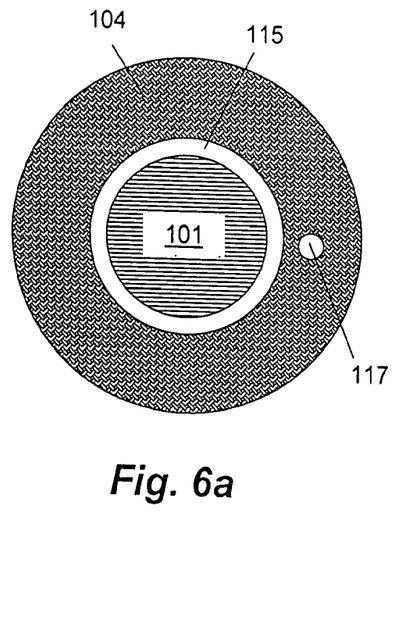
FIG. 6 illustrates several top cross-sectional views of hub and spindle assemblies with fluid communication channels according to various embodiments of the invention
Figure 6B:
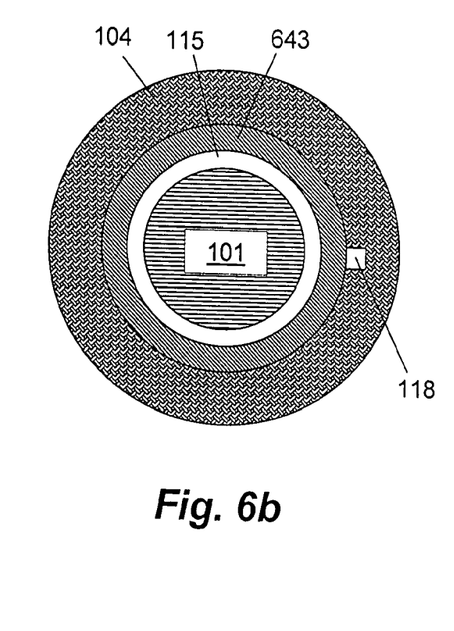
Figure 6C:
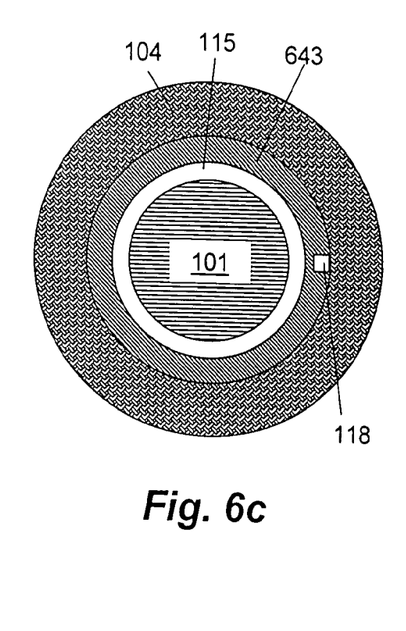

FIGS. 6a-6c show top cross-sectional views of hub and spindle assemblies according to various embodiments of the invention. FIG. 6a illustrates an embodiment in which hub 104 has an integral journal bearing sleeve (corresponding to the embodiment described in connection with FIG. 4), and can rotate around spindle 101. Lubricant fluid communication channel 117, is formed in the journal bearing sleeve parallel to the spindle axis. FIGS. 6b and 6c correspond to the embodiment described in connection with FIG. 5, in which the journal bearing sleeve 643 is a separate part that is coupled to hub 104. In the embodiment of FIG. 6b, the lubricant fluid communication channel 118 is formed by the journal bearing sleeve 643 and a groove in a facing section of the hub 104. In the embodiment of FIG. 6c, the lubricant fluid communication channel 118 is formed by hub 104 an a groove in the journal bearing sleeve 643 that faces hub 114. In all of these cases, the lubricant fluid communication channel runs the length of the journal bearing area and terminates at the first and second shoulders (917 and 919, respectively, in FIGS. 2a and 7). Although single fluid communication channels are shown in FIGS. 6a-6c, multiple channels may be used in some embodiments to increase lubricant fluid communication.

Figure 7:
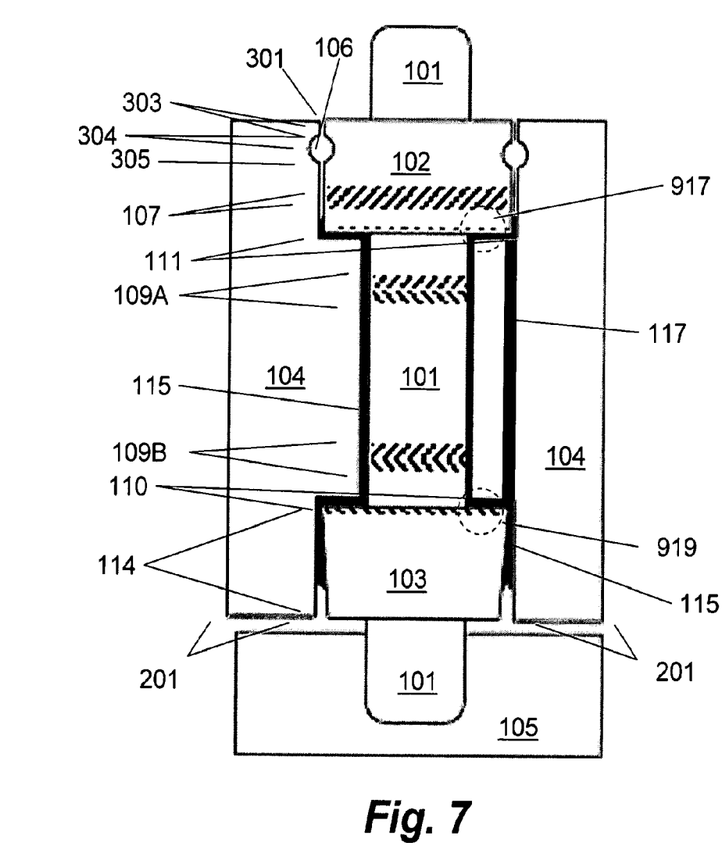
FIG. 7 illustrates an operation of an embodiment of the invention.

FIG. 7 is a cross-section diagram useful to demonstrate the integrated operation of an embodiment of the invention for review. Fixed spindle 101 is irrotatably mounted to base plate 105. First and second thrust washers, 102 and 103, respectively, are irrotatable mounted to spindle 101 approximately as shown. Hub 104 is rotatably positioned coaxially with spindle 101. The facing portions of spindle 101 between first and second thrust washers 102 and 103, respectively, and the facing surfaces of the hub (or the journal bearing sleeve in some embodiments) is the journal bearing area. The journal bearing area provides radial position stability to the hub as it rotates with respect to the spindle. The surfaces of first thrust washer 102 and second thrust washer 103 that face together form first and second thrust bearing portions, 111 and 110 respectively, with first and second shoulders (917 and 919, respectively in FIGS. 2a and 8) of the journal sleeve proximate to first and second thrust washers (102 and 103, respectively. The first thrust bearing portion 111 limits axial movement of the hub 104 toward the first end of spindle 101, while allowing the hub 104 to rotate. The lower thrust bearing portion 110 limits axial displacement of the hub 104 toward the second end of spindle 101, while allowing hub 104 to rotate.

A lubricant fluid 115 fills the gaps between the mating hub and spindle surfaces for the journal bearing area. The lubricating fluid 115 also fills the gaps between the mating thrust washer and hub surfaces for the first and second thrust bearing portions.

Spindle 101 is patterned with land and groove features formed in first and second circumferential bands 109A and 109B, respectively, to form first and second fluid dynamic journal bearing pumps. A rotational motion of hub 104 imparts a rotational motion to lubricant fluid 115. The patterns of the bearing pumps cause the moving lubricant fluid to travel toward the center of each circumferential band, thereby increasing lubricant fluid pressure in these circumferential regions to provide fluid dynamic journal bearing function.

Similarly, the parallel facing surfaces 111 and 110 of first and second thrust washers, 102 and 103 respectively, are patterned with land and groove features formed thereon so as to increase lubricant fluid pressure in an annular band for each to provide fluid dynamic thrust bearing function.

The lubricant fluid 115 is sealed at the first and second ends of the spindle using different methods.

The outermost seal at the first end of spindle 101 is formed by ring seal 106, formed circumferentially on the first thrust washer 102 and/or the mating surface of the hub. The ring seal comprises a capillary seal portion 305, and a tapering portion 304, connecting with a labyrinth channel 303. When the hub is not rotating, a lubricant fluid meniscus remains in capillary seal portion 302 as a result of surface tension (see also 307 in FIG. 2b). Section 304 of ring seal 106 tapers to and connects with channel 303 that forms a labyrinth seal to also suppress evaporation of the lubricant fluid.

A fluid dynamic pump seal 107 of a groove and land pattern is formed circumferentially on the first thrust washer between the ring seal 106 and the first thrust bearing portion 111. When hub 104 is in rotation, pump seal 107 forces lubricating fluid 115 toward the first thrust bearing, thereby preventing escape through channel 301 to the outside of the hub and spindle assembly.

The second thrust washer 103 tapers downward in diameter toward the second end of the spindle. This forms channel 114 of increasing width that functions as a second capillary seal for lubricant fluid 115. The capillary seal formed in channel 114 has a larger meniscus area than the capillary seal 305 associated with ring seal 106, and thereby can function as a reservoir for lubricant fluid 115. However, the larger meniscus area means that the second capillary seal is more prone to lubricant fluid loss through evaporation. The gap 201 between hub 104 and base plate 105 forms a rather extensive labyrinth seal to suppress lubricant fluid evaporation.

Thus the hub and spindle assembly has seals at the first end of the spindle to provide for good lubricant fluid containment in a compact structure, and has seals at the second end of the spindle to provide a lubricant fluid reservoir. A resulting problem, however is that the pump seal 107 tends to increase the lubricant fluid pressure beyond what the seals at the second end of the spindle can contain, resulting in loss of lubricant fluid through the second seal. A solution to this problem is to provide a lubricant fluid communication channel 117 between the first 102 and second 103 fluid dynamic thrust bearings. A lubricant fluid communication channel can be implemented according to, for example, the embodiments discussed above in connection with FIG. 6. As long the termini of the channel does not substantially interrupt so much of the annular fluid dynamic thrust pump band areas 110 and 111, first and second thrust bearing functions is maintained. The circulation of the lubricant fluid from the second seal to the first seal, and back again, tends to purge any air bubbles that may be injected into the lubricant fluid by the pump, first seal.

The present embodiments of the invention thereby use first and second seal types that are appropriate for their position and function in the hub and spindle assembly, while using channels for pressure communication between the first and second seals in order to minimize lubricant fluid loss. The resulting benefits include a more compact hub and spindle assembly size and a prolonged operational life.

Other features and advantages of this invention will be apparent to one of ordinary skill in the art who studies this invention disclosure. Therefore the scope of this invention is to be limited only by the following claims.

The invention claimed is:

1. An apparatus, comprising:
   a spindle having a spindle axis, and first and second ends;
   a hub disposed coaxially to the spindle;
   a first thrust bearing adjacent to the first end of the spindle;
   a first thrust washer adjacent to the first end of the spindle;
   a second thrust bearing adjacent to the second end of the spindle;
   a journal bearing disposed between the first and second thrust bearings;
   a first fluid seal that includes a fluid pump operable to pump fluid toward the first thrust bearing, adjacent to the first thrust bearing, wherein the first fluid seal includes a circumferential pattern of lands and grooves formed in a face of the first thrust washer facing the hub;
   a ring seal coated with a barrier film coating adjacent to the first fluid seal;
   a second fluid seal adjacent to the second thrust bearing; and
   a channel operable to circulate a lubricant fluid between the first and second fluid seals and further operable to purge air,
   wherein the ring seal includes a first circumferential groove formed in the first thrust washer between the pattern of lands and grooves formed in the face of the first thrust washer and the first end of the spindle, and a second circumferential groove formed in a face of the hub facing the first circumferential groove.

2. The apparatus of claim 1, wherein the hub defines the channel connecting the first and second fluid seals.

3. The apparatus of claim 1, further comprising:
a second thrust washer adjacent to the second end of the spindle, wherein the second fluid seal comprises an annular channel formed between the hub and the second thrust washer, and wherein the annular channel is at least partially filled with a lubricating fluid that terminates in a meniscus.

4. The apparatus of claim 1, further comprising:
a base plate coupled to the second end of the spindle thereby forming a labyrinth seal as a gap between the base plate and a proximate parallel face of the hub.

5. An apparatus, comprising:
a spindle having a spindle axis, and first and second ends;
a hub disposed coaxially to the spindle;
a first thrust bearing adjacent to the first end of the spindle;
a second thrust bearing adjacent to the second end of the spindle;
a journal bearing disposed between the first and second thrust bearings;
a first fluid seal that includes a fluid pump operable to pump fluid toward the first thrust bearing, adjacent to the first thrust bearing;
a ring seal coated with a lubricant fluid-repelling barrier film coating adjacent to the first fluid seal, wherein the ring seal includes a first circumferential groove formed in a first thrust washer between a pattern of lands and grooves formed in a face of the first thrust washer and the first end of the spindle;
a second fluid seal adjacent to the second thrust bearing; and
a channel operable to circulate a lubricant fluid between the first and second fluid seals and further operable to purge air.

6. The apparatus of claim 5, wherein the hub defines the channel connecting the first and second fluid seals.

7. The apparatus of claim 5, further comprising:
a journal bearing sleeve coaxially positioned within, and coupled to the hub; and
a groove formed in the surface of the journal bearing sleeve, facing the hub, and forming the channel connecting the first and second fluid seals.

8. The apparatus of claim 5, further comprising:
a journal bearing sleeve coaxially positioned within, and coupled to the hub; and
a groove formed in the surface of the hub, facing the journal bearing sleeve, and forming the channel connecting the first and second fluid seals.

9. The apparatus of claim 5, wherein the first thrust bearing includes a pattern of lands and grooves formed in a surface of the first thrust bearing, and wherein the second thrust bearing includes a pattern of lands and grooves formed in a surface of the second thrust bearing.

10. The apparatus of claim 5, further comprising:
the first thrust washer adjacent to the first end of the spindle, wherein the first fluid seal includes a circumferential pattern of lands and grooves formed in a face of the first thrust washer facing the hub.

11. The apparatus of claim 10, wherein the ring seal includes a second circumferential groove formed in a face of the hub facing the first circumferential groove.

12. The apparatus of claim 5, further comprising:
the first thrust washer adjacent to the first end of the spindle, wherein the first fluid seal includes a circumferential pattern of lands and grooves formed in the surface of the hub facing the first thrust washer.

13. The apparatus of claim 5, further comprising:
a second thrust washer adjacent to the second end of the spindle, wherein the second fluid seal comprises an annular channel formed between the hub and the second thrust washer, and wherein the annular channel increases in size toward the second end of the spindle.

14. The apparatus of claim 5, further comprising:
a second thrust washer adjacent to the second end of the spindle, wherein the second fluid seal comprises an annular channel formed between the hub and the second thrust washer, and wherein the annular channel is at least partially filled with a lubricating fluid that terminates in a meniscus.

15. The apparatus of claim 5, further comprising:
a second thrust washer adjacent to the second end of the spindle, and
first and second shoulder regions defined by the hub, the spindle, and the first and second thrust washers, respectively, wherein the journal bearing includes a pattern of lands and grooves on the surface of the spindle facing the hub between the first and second shoulders.

16. The apparatus of claim 5, further comprising:
a second thrust washer adjacent to the second end of the spindle, and
first and second shoulder regions defined by the hub, the spindle, and the first and second thrust washers, respectively, wherein the journal bearing includes a pattern of lands and grooves on the surface of the hub between the first and second shoulders that faces the spindle.

17. The apparatus of claim 2, further comprising:
a base plate coupled to the second end of the spindle thereby forming a labyrinth seal as a gap between the base plate and a proximate parallel face of the hub.

* * * * *